United States Patent [19]

Rapp-Duncan

[11] Patent Number: 6,056,178
[45] Date of Patent: May 2, 2000

[54] AUXILIARY BIN FOR A SHOPPING CART

[76] Inventor: Janice Rapp-Duncan, 30 Camelot Dr., NW., Cartersville, Ga. 30121

[21] Appl. No.: 09/175,897

[22] Filed: Oct. 20, 1998

[51] Int. Cl.⁷ .......................................................... B60R 7/00
[52] U.S. Cl. ........................................ 224/411; 280/33.992
[58] Field of Search ..................................... 224/411, 563, 224/566; 280/33.992, DIG. 4; 220/495.01, 485, 489, 491, 493

[56] References Cited

U.S. PATENT DOCUMENTS

| | | |
|---|---|---|
| 4,966,318 | 10/1990 | Dutka . |
| 5,012,966 | 5/1991 | Turner et al. ............................ 224/411 |
| 5,048,736 | 9/1991 | Anatra . |
| 5,362,077 | 11/1994 | Adamson . |
| 5,366,123 | 11/1994 | Range . |
| 5,387,037 | 2/1995 | Daitch . |
| 5,494,308 | 2/1996 | Southerland . |

*Primary Examiner*—Gregory M. Vidovich
*Assistant Examiner*—Maerena W. Brevard
*Attorney, Agent, or Firm*—Henderson & Sturm

[57] ABSTRACT

An auxiliary shopping cart bin that is securable to the mesh bin of an existing shopping cart. The auxiliary bin includes a small collapsible bin having a very small open grid work for holding small toys, cosmetics, candy, etc., that would fall through the larger openings in the grid of the shopping cart. The auxiliary bin is attachable via a bracket to the grid work of the existing grocery cart. A latch holds the auxiliary bin in the collapsed position when it is not in use.

3 Claims, 1 Drawing Sheet

AUXILIARY BIN FOR A SHOPPING CART

CROSS-REFERENCE TO RELATED APPLICATIONS

Not Applicable

STATEMENT REGARDING FEDERALLY SPONSORED RESEARCH OR DEVELOPMENT

Not Applicable

REFERENCE TO MICROFICHE APPENDIX

Not Applicable

BACKGROUND OF THE INVENTION

1. Field of the Invention

The present invention relates to the field of shopping cart accessories, and more particularly to an auxiliary bin for small items.

2. Description of the Related Art

As can be seen by reference to the following U.S. Pat. Nos. 5,494,308; 5,387,037; 5,366,123; 5,362,077; 5,048,736; and 4,966,318; the prior art is replete with myriad and diverse shopping cart accessories.

While all of the aforementioned prior art constructions are more than adequate for the basic purposes and function for which they have been specifically designed, they are uniformly deficient with respect to their failure to provide a simple, efficient, and practical auxiliary bin for shopping carts.

As a consequence of the foregoing situation, there has existed a longstanding need or a new and improved auxiliary bin for shopping carts and the provision of such a construction is a stated objective of the present invention.

BRIEF SUMMARY OF THE INVENTION

Briefly stated, the present invention provides an auxiliary shopping cart bin that is securable to the mesh bin of an existing shopping cart. The auxiliary bin includes a small collapsible bin having a very small open grid work for holding small toys, cosmetics, candy, etc., that would fall through the larger openings in the grid of the shopping cart. The auxiliary bin is attachable via a bracket to the grid work of the existing grocery cart. A latch holds the auxiliary bin in the collapsed position when it is not in use.

BRIEF DESCRIPTION OF THE SEVERAL VIEWS OF THE DRAWINGS

These and other attributes of the invention will become more clear upon a thorough study of the following description of the best mode for carrying out the invention, particularly when reviewed in conjunction with the drawings, wherein.

DETAILED DESCRIPTION OF THE INVENTION

Figure 1:
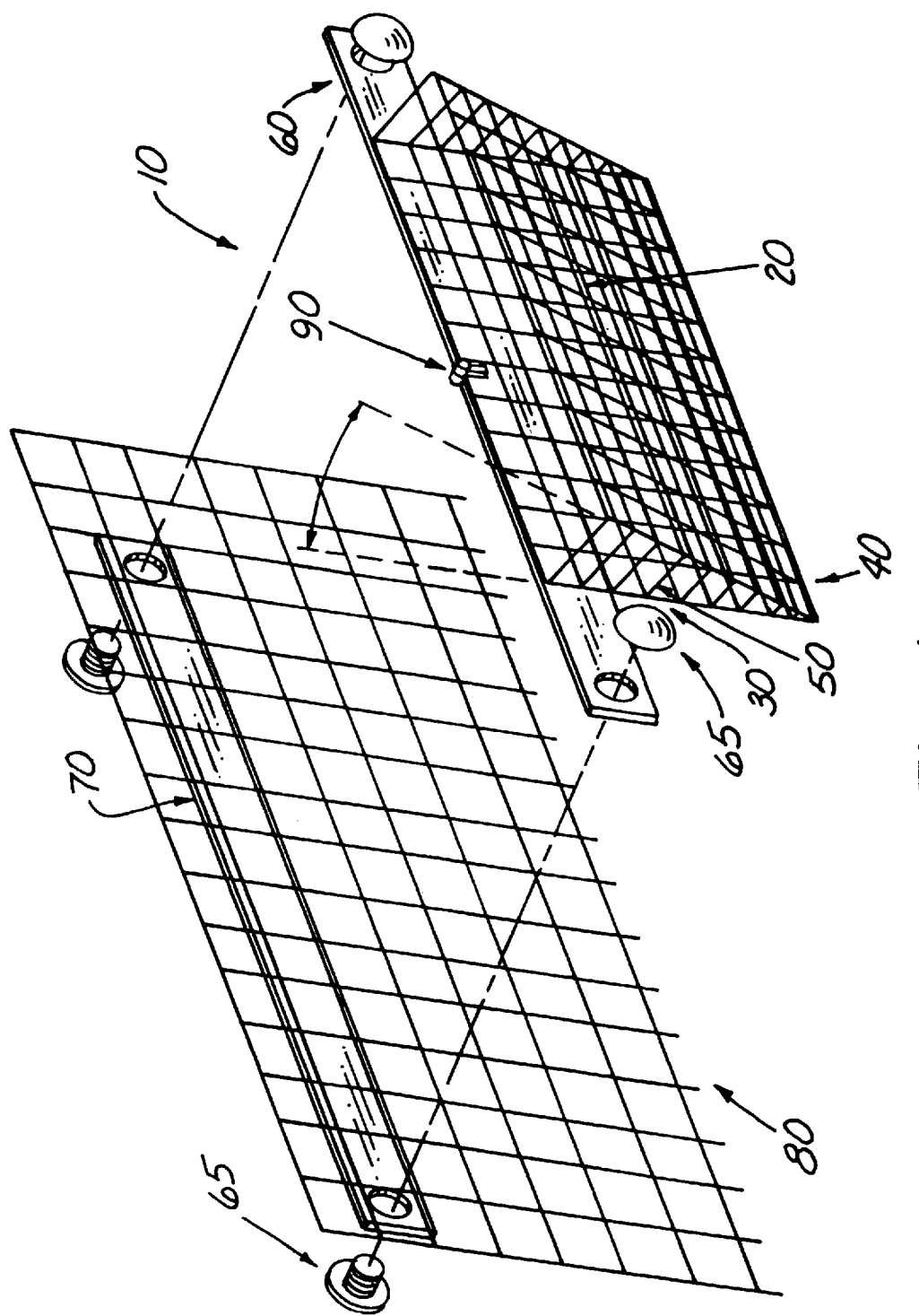
FIG. 1 is a partial exploded perspective view showing the attachment of the auxiliary bin of the present invention to an existing shopping cart.

As can be seen by reference to the drawings, and in particularly to FIG. 1, the auxiliary bin that forms the basis of the present invention is designated generally by the reference number 10.

The auxiliary bin 10 includes a rigid open-grid outer wall 20 and a rigid open-grid inner wall 30 connected at the bottom by a hinge 40, and connected along the sides by a flexible collapsible web or members 50. A first frame fastening bar 60 is attached along the top of the inner wall 30 and cooperates with a second frame fastening bar 70 that is positioned inside the open-grid wall 80 of a conventional shopping cart. Fasteners 65 attach the first and second bars 60, 70 and secure the auxiliary bin 10 to the shopping cart. A pivotable latch 90 is attached to the inner wall 30 and operates to hold the outer wall 20 when the bin 10 is in the collapsed position.

The auxiliary bin includes a plastic or rubber coated metal framework having a very tight or compact cross hatch grid, and a hinged bottom, allowing the unit to open up for use or collapse flat when not required. The assembly attaches to the existing frame of a shopping cart with the use of a pair of fastener frames with a hole at each end, and large snap-together round-head rivet-type mounting hardware. One of the fastener frames is attached to the auxiliary bin framework. A small flip-type latch allows the auxiliary bin to be secured in the collapsed position when desired. The compact design allows it to be permanently attached to a standard plastic or metal grid shopping cart in almost any position. Although intended as an add-on accessory for existing shopping carts, the concept could also be incorporated into the design of newly manufactured carts.

In use, the store manager would simply attach the auxiliary bin to the desired location of each of the stores shopping carts with the use of the fastener frames and rivet-type mounting devices. One fastener frame goes on each side of the existing shopping cart frame grid. Upon installation, the shoppers would enjoy the benefit of having a small bin with a very tight grid work on their cart to place those very small items which tend to fall to the floor through the carts larger sized grid. The grid of the auxiliary bin, although small, would still be see through, allowing the consumer and checker to be able to quickly and easily determine if an item is in the bin. When the use of the auxiliary bin is not required, it can be collapsed flat and secured with the flip latch, so as to not be in the way while shopping. Use of the auxiliary bin provides a very practical and convenient method of allowing a shopper to prevent those small items such as lipstick, candy, sample packets, etc., from falling out of the cart.

Although only an exemplary embodiment of the invention has been described in detail above, those skilled in the art will readily appreciate that many modifications are possible without materially departing from the novel teachings and advantages of this invention. Accordingly, all such modifications are intended to be included within the scope of this invention as defined in the following claims.

What is claimed is:

1. An auxiliary bin in combination with a shopping cart having open-grid sidewalls, the combination comprising:

a rigid outer wall having an open-grid sized smaller than the open-grid sidewall of the shopping cart, the outer wall having a bottom, top, and lateral edges;

a rigid inner wall having an open-grid of the size of the outer wall, the inner wall having a bottom, a top, and lateral edges and being pivotally attached to the outer wall adjacent their respective bottoms;

a plurality of flexible, collapsible members respectively attached to and connecting opposing lateral edges of the outer wall and inner wall; and a first frame fastening bar attached to the inner wall and being disposed to attach to the sidewall of the shopping cart.

2. The combination of claim 1, further including a second frame fastening bar attached to an inner sidewall of the shopping cart and being disposed to connect to the first frame fastening bar.

3. The combination of claim 1, further including a latch attached to the inner wall and being disposed to engage and secure the outer wall when the auxiliary bin is in a collapsed position.

\* \* \* \* \*